United States Patent [19]

Arroyo

[11] Patent Number: 5,082,719

[45] Date of Patent: Jan. 21, 1992

[54] WATER RESISTANT COMMUNICATIONS CABLE

[75] Inventor: Candido J. Arroyo, Lithonia, Ga.

[73] Assignee: AT&T Bell Laboratories, Murray Hill, N.J.

[21] Appl. No.: 378,956

[22] Filed: Jul. 12, 1989

Related U.S. Application Data

[62] Division of Ser. No. 115,123, Oct. 30, 1987, Pat. No. 4,867,526.

[51] Int. Cl.$^5$ .................. B32B 27/14; B32B 27/20; G02B 6/44; H02G 3/04
[52] U.S. Cl. .................. 428/219; 174/23 C; 428/220; 428/283; 428/290; 428/296; 385/102; 385/107
[58] Field of Search ........... 174/23 C; 350/96.23; 428/283, 290, 296, 219, 220

[56] References Cited

U.S. PATENT DOCUMENTS

| | | | |
|---|---|---|---|
| 2,316,129 | 4/1943 | Bock | 536/50 |
| 3,425,971 | 2/1969 | Gugliemelli et al. | 525/54.32 |
| 3,509,269 | 4/1970 | Elliot | 174/107 |
| 3,538,235 | 11/1970 | Arendt et al. | 174/23 C |
| 3,661,815 | 5/1972 | Smith | 525/54.32 |
| 3,803,339 | 4/1974 | Speekman | 174/23 C |
| 3,849,361 | 12/1974 | Zweigle | 524/376 |
| 4,002,819 | 1/1977 | Woytiuk | 174/23 C |
| 4,059,552 | 11/1977 | Zweigle et al. | 524/555 |
| 4,172,066 | 10/1979 | Zweigle et al. | 523/223 |
| 4,241,979 | 12/1980 | Gagen et al. | 350/96.23 |
| 4,260,443 | 4/1981 | Lindsay et al. | 156/220 |
| 4,282,121 | 8/1981 | Goodrich | 525/54.26 |
| 4,366,294 | 12/1982 | Williams et al. | 525/327.6 |
| 4,401,366 | 8/1983 | Hope | 350/96.23 |
| 4,596,443 | 6/1986 | Diemeer et al. | 350/96.23 |
| 4,599,379 | 9/1986 | Flesher et al. | 524/801 |
| 4,622,263 | 11/1986 | Ando et al. | 428/288 |
| 4,649,164 | 3/1987 | Scott et al. | 521/149 |
| 4,701,015 | 10/1987 | Saito et al. | 350/96.23 |
| 4,701,016 | 10/1987 | Gartside, III et al. | 350/96.23 |
| 4,703,997 | 11/1987 | Ijiri et al. | 350/96.23 |
| 4,703,998 | 11/1987 | Uchioke et al. | 350/96.23 |
| 4,729,629 | 3/1988 | Saito et al. | 350/96.23 |
| 4,767,184 | 8/1988 | Ogasawara et al. | 350/96.23 |
| 4,815,813 | 3/1989 | Arroyo et al. | 174/23 C |
| 4,820,560 | 4/1989 | Buckwald et al. | 428/283 |
| 4,844,575 | 7/1989 | Kinard et al. | 174/23 C |
| 4,867,526 | 9/1989 | Arroyo | 174/23 C |
| 4,902,559 | 2/1990 | Eschwey et al. | 428/224 |

FOREIGN PATENT DOCUMENTS

| | | |
|---|---|---|
| 3330957 | 3/1985 | Fed. Rep. of Germany. |
| 80/01517 | 7/1980 | PCT Int'l Appl. |
| 86/04691 | 8/1986 | PCT Int'l Appl. |
| 2172410 | 9/1986 | United Kingdom. |
| 2186098 | 8/1987 | United Kingdom. |

OTHER PUBLICATIONS

B. J. Nieuwhof, "Longitudinal Waterblocking Performance of Conductive and Non Conductive Waterswellable Nonwovens", International Wire & Cable Symposium 1983.
B. J. Nieuwhof, "Conductive and Non Conductive Water Expandable Nonwoven Tapes for Longitudinal Water Blocking in Energy and Telcom Cables".
Firet Brochure, "Waterblocking, A Dutch Speciality".
DuPont Technical Information Brochure, "Reemay ®".
Djock, J. C.; Klem, R. E., "Review of Synthetic and Starch-Graft Copolymer Superabsorbents", Insight '83 Absorbent Products Conference Nov. 16-17, 1983.
"Lanseal-F" Super Absorbent Fiber Brochure, Chori America, Inc. on Behalf of Japan Exlan Co. Ltd.
FIRET Brochure, "Problem solutions for industrial applications Non-woven tapes for the cable industry".

*Primary Examiner*—James C. Cannon
*Attorney, Agent, or Firm*—Edward Somers

[57] ABSTRACT

A communications cable comprising a core of at least one transmission medium and a plastic jacket includes provisions for preventing the movement of water within the cable. An impregnated tape (35) is interposed between the core and the jacket and is wrapped about the core to form a longitudinal overlapped seam. The tape comprises a substrate tape (37) which is impregnated with a superabsorbent material which upon contact with water swells and inhibits the further movement of the water. The tape and its thickness are controlled so that the thickness is minimal while the tensile strength of the tape and its porosity prior to impregnation are optimized.

11 Claims, 5 Drawing Sheets

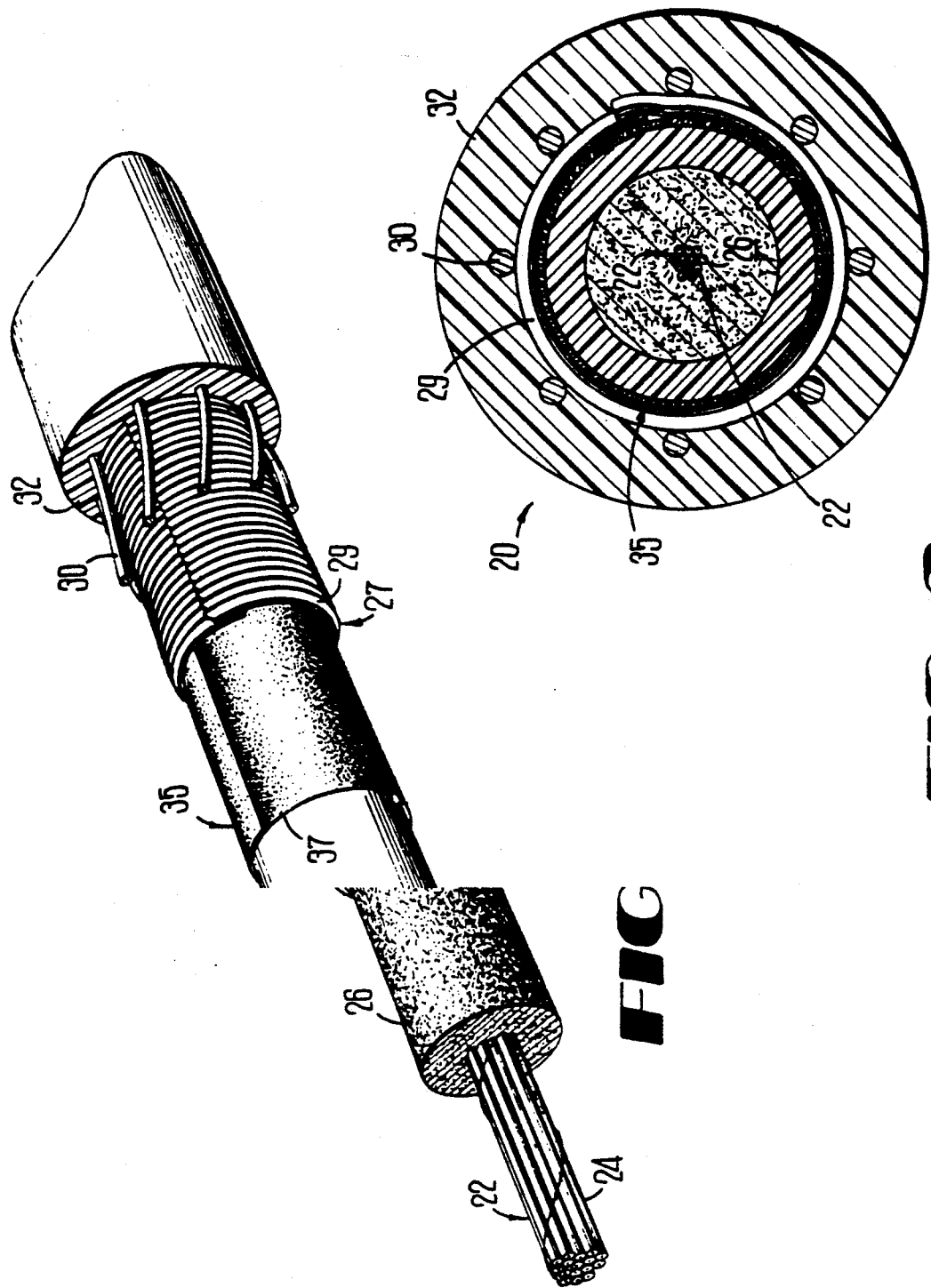

WATER RESISTANT COMMUNICATIONS CABLE

This is a division of application Ser. No. 07/115,123 filed Oct. 30, 1987, now U.S. Pat. No. 4,867,526.

TECHNICAL FIELD

This invention relates to a water resistant communications cable. More particularly, it relates to a communications cable which includes facilities for preventing the passage of water through a sheath system of the cable and the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the cable which compromises its integrity. For example, lightning or mechanical impacts may cause openings in the sheath system of the cable to occur, allowing water to enter, and, if not controlled, to move longitudinally along the cable into splice closures, for example.

Lately, optical fiber cables have made great inroads into the communications cable market. Although the presence of water itself within an optical fiber cable is not detrimental to its performance, passage of the water along the cable interior to connection points or terminals or associated equipment may cause problems and should be prevented. Further, in some climates, the development of ice within an optical fiber cable may have a crushing influence on the optical fibers in the core which may affect adversely the attenuation thereof.

In the prior art, various techniques have been used to prevent the ingress of water through the sheath system of a cable and into the core. For example, a metallic shield which often times is used to protect a cable against electromagnetic interference is provided with a sealed longitudinal seam. However, because lightning strikes may cause holes in the metallic shield, it is not uncommon to include additional provisions for preventing the ingress of water into the core. Filling materials have been used to fill cable cores and to coat portions of cable sheath systems to prevent the movement longitudinally thereof of any water which enters the cable. Although the use of a filling material causes housekeeping problems, inhibits line speeds because of the need to fill carefully interstices of the core and presents problems for field personnel during splicing operations, for example, it continues to be used to prevent entry of the water into the core.

Presently, many commercially available cables also include a water-swellable tape. The tape is used to prevent the travel of water through the sheath system and into the core as well as its travel longitudinally along the cable to closures and termination points, for example. Such a tape generally is laminated, including a water swellable powder which is trapped between two cellulosic tissues. Further included may be a polyester scrim which is used to provide tensile strength for the laminated tape. Although such a tape provides suitable water protection for the cable, it is relatively expensive and thick. If the tape is too thick, the diameter of the cable is increased, thereby causing problems in terminating the cable with standard size hardware.

What is needed and what does not appear to be available in the marketplace is a tape which is relatively thin and relatively inexpensive. Such a tape should be one which is compressible and which has acceptable tensile properties. Also, because in some optical fiber cables, the tape is engaged by helically wound metallic strength members, it should be able to conform to the configurations of those members and to allow those members to become bedded therein. If the tape has this capability, commonly used strength member wires will not move about and will provide torsional stability from layer to layer. On the other hand, if the tape does not have this capability and if all the wires were to assume positions on one portion of the periphery, the cable would not be balanced torsionally and would be very difficult to bend.

Care also must be taken to avoid problems caused by what is referred to as bleed-through of molten plastic jacketing material. With a tape comprised of a highly porous substrate material, the greater the linespeed the greater the flow of the molten plastic material into the tape and the more difficult it becomes to strip the jacket to expose the core. As a result, it has been known that the use of such a highly porous substrate material severely limits the line speed.

Seemingly, the prior art does not disclose a cable which is provided with a water arresting tape having all the hereinbefore-identified properties and which is relatively easy to incorporate into a cable. The solution to this problem should bring rewards in that smaller size cables and higher line speeds will be achievable.

SUMMARY OF THE INVENTION

The foregoing problems of the prior art have been overcome with the cable of this invention. That cable includes a core which may include optical fibers or metallic conductors and a plastic jacket. Interposed between the core and the jacket is an elongated substrate member which comprises an impregnated non-metallic, non-woven web-like material in the form of a tape. The non-woven, web-like material of which the substrate member is comprised has a relatively high tensile strength and is relatively thin. Such a material is relatively compressible and has sufficient porosity to permit entry of sufficient impregnating material so that it provides enhanced water-blocking capability after it has been included in a cable. Before being impregnated with the water-swellable material, it has a relatively high porosity.

The substrate member is impregnated with a material which is held in the non-woven, web-like member in suspension without its being reacted. When exposed to water, the impregnating material reacts to swell and cause the tape to prevent the passage of water through the sheath system toward the core and its migration in a direction longitudinally along the cable. In a preferred embodiment, the impregnating material comprises a film of a water swelling or so-called superabsorbent material. In another embodiment, a tape may be treated with a paste comprising a superabsorbent material. The impregnating material may be a polyacrylic acid having a saponification in a relatively wide range or it may be a polyacrylamide. Also, the impregnating material may comprise blends or salts of polyacrylic acid or polyacrylamide, or copolymers or derivatives of the acrylic acid and the acrylamide.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a perspective view of a communications cable having a sheath system which includes a water blockable tape with various layers of the sheath system broken away and some of the layers exaggerated in thickness for purposes of clarity;

FIG. 2 is an end sectional view of the cable of FIG. 1 which illustrates some elements of the cable in greater detail;

DETAILED DESCRIPTION

Figures 3, 4:
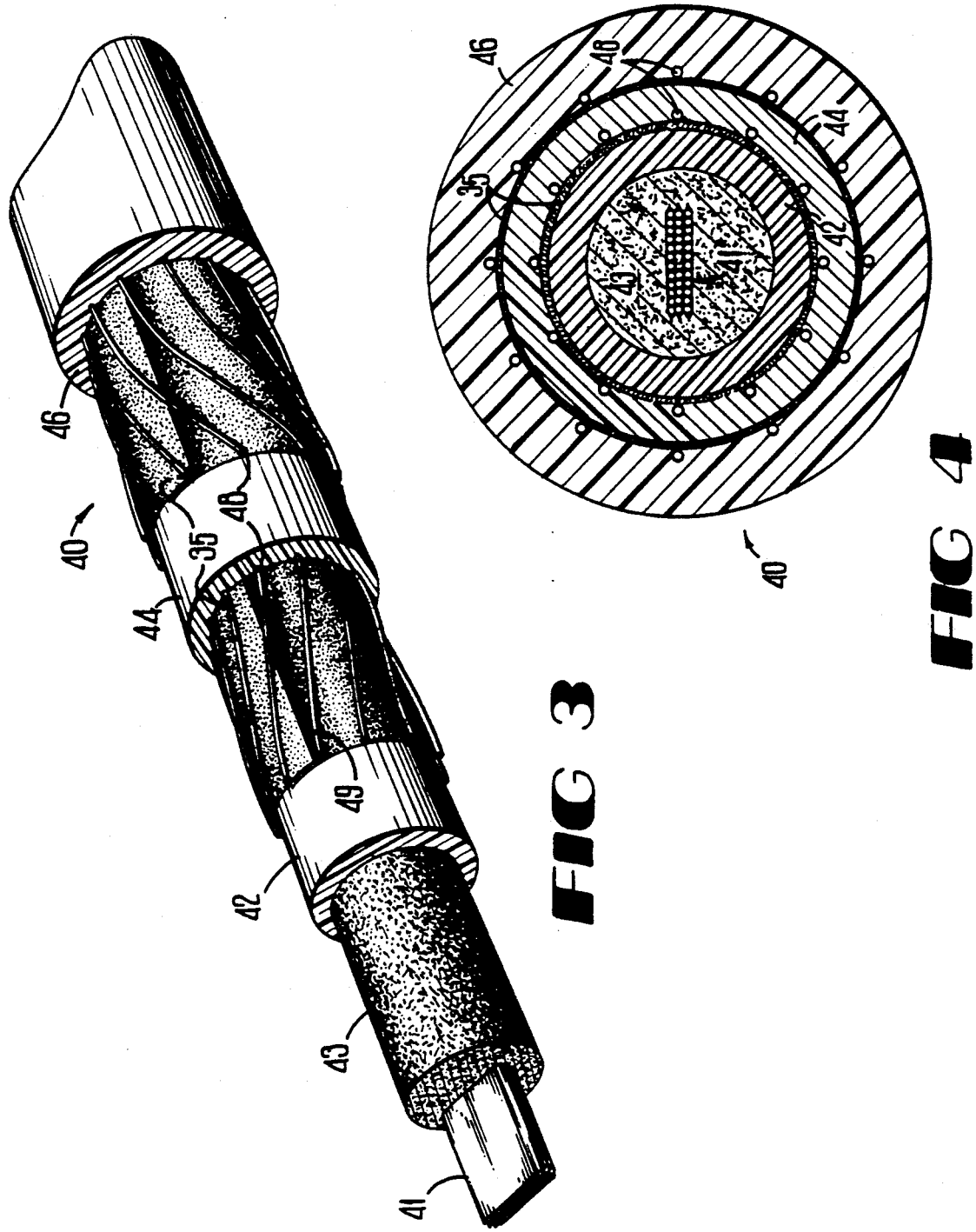
FIG. 3 is a perspective view of another cable of this invention which includes a water blockable tape.
FIG. 4 is an end sectional view of the cable of FIG. 3.

Referring now to FIGS. 1 and 2, there is shown a communications cable which is designated generally the numeral 20. It includes a core 22 comprising one or more optical fibers 24—24 and being filled with a material 26 such as that disclosed in U.S. Pat. No. 4,701,016 issued on Oct. 20, 1987 in the names of C. H. Gartside III, et al. The core is enclosed by a sheath system 27 which includes a core tube 28 which encloses the optical fibers, a corrugated metallic shield 29, one or more layers of strength members 30—30 and an outer jacket 32. Disposed between the shield 29 and the core tube 28 is a water blockable tape which is designated generally by the numeral 35. The water blockable tape 35 comprises a substrate or carrier tape 37 which is made of a hydrophobic material and which has been treated with a water blockable material. Advantageously, the treated tape is hydrophilic. A hydrophilic material is one that has a strong affinity for water in that it absorbs water easily.

In a preferred embodiment, the tape 37 is a spunbonded nonwoven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material, which is substantially nonhygroscopic, and which has the capability of maintaining its shape in the presence of the temperatures encountered during the extrusion of the jacket 32. The fibers of the web structure are arranged so that air cells or pockets are formed.

A polyethylene terephthalate fiber product, formed into a web structure as described above has been identified under the registered trademark "Reemay" by the E. I. du Pont de Nemours and Company, Incorporated of Wilmington, Del. Presently, the Reemay ® web structure is available in various thicknesses and densities from Reemay, Inc. of Old Hickory, Tenn. The properties of Reemay ® tapes are further defined and described in Bulletin R-1, dated March, 1986, entitled "Properties and Processing of Reemay ® Spunbonded Polyester" from E. I. du Pont de Nemours and Company, Incorporated, Wilmington, Del.

Although in a preferred embodiment, a spunbonded polyester tape is used, others also are acceptable. For example, the tape which is to be impregnated may be a nylon spunbonded fabric, non-woven glass, polypropylene melt blown non-woven fabric, polyurethane spunbonded fabric or TCF cellulose fabric, for example.

Advantageously, the carrier tape 37 of this invention also acts as a thermal barrier. As the jacket is extruded over the shield 29, heat is available for transfer into the insulated conductors. The tape 35 of the cable 20 has the ability to insulate against the heat caused by the extrusion of the jacket.

Another important characteristic of the tape 37 is the stiffness of the body of the material which comprises the tape. Within limits, as the material of the tape 37 is made increasingly stiffer, it is still relatively easy to form the tape longitudinally about the cable core 22, without wrinkling. However, it is important that the material be supple and flacid enough to conform readily to the contour of the outer surface of the core so that a minimal peripheral dimension is presented over which the dielectric jacket is applied. As a desirable consequence, a minimum overall diameter is achieved for the cable which will meet all the necessary requirements.

Stiffness of the material for the tape 37 is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least four factors, formability of the tape 37, cost of the tape, insulative capability of the tape, and its water blocking capability must be considered and balanced in providing the proper material for use on a particular cable.

In a preferred embodiment, the spunbonded polyester tape 37 combines the thermal, chemical and mechanical properties of polyester fibers with a spunbonded structure to provide a tape which is suitable for use in a communications cable. These properties include a relatively high tensile strength and elongation, excellent tear strength, and resistance to temperatures as high as about 400° F.

In order to render the substrate tape swellable upon contact with moisture, the carrier tape 37 is impregnated with a suitable water swellable material which herein is referred to as a superabsorbent material. As will be recalled, the impregnated tape is designated with the numeral 35.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16-17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

The spunbonded carrier tape 37 may be impregnated with any of several water blocking superabsorbent materials. In a preferred embodiment, it is impregnated with a superabsorbent material which is derived from an aqueous solution comprising acrylate polymeric material which combines acrylic acid and sodium acrylate functionalities and water.

The impregnating material of the preferred embodiment comprises a sodium salt of polyacrylic acid in which all the carboxylic groups may or may not be reacted with sodium. In other words, it is saponified in whole or in part. The level of saponification which may fall within a relatively wide range depends on desired properties. After the substrate tape 37 has been impregnated, the superabsorbent material is dried to provide a film on the tape. It is desirable to impregnate the tape 35 with a film of the impregnating material instead of a powder. The impregnated tape 35 has a density of about 1.1 to 1.8 ounces per square yard which includes the density of the untreated tape 37 increased 10 to 80%, i.e. the add-on, by the treating material.

In another embodiment, a Reemay ® spunbonded polyester tape is impregnated with an aqueous solution comprising acrylates and acrylamide polymer powders mixed with water. The tape impregnated with such a composition has a density which may represent an increase as high as about 80% of the density of the untreated tape 37. In each of the embodiments just described, the impregnating material is a mixture of water and a superabsorbent material in which the mixture comprises about 4 to 7% solids when the impregnating material is an aqueous solution and applied.

In general, the tape 37 may be impregnated with (1) a material comprising polyacrylic acid, or (2) a material comprising polyacrylamide or (3) blends of (1) and (2) or salts thereof or (4) copolymers of acrylic acid and acrylamides and salts thereof as well as other similar superabsorbents.

Advantageously, in response to contact with water, the superabsorbent material in a cable structure swells to block the flow of water including that in a longitudinal direction. The superabsorbent material also forms a gel and changes the viscosity of the ingressed water at the point of contact with the superabsorbent material, making it more viscous and consequently developing more resistance to water flow. As a result, the flow of water longitudinally along a cable from a point of entry is reduced substantially.

The carrier tape 37 also possesses specific properties such as porosity and thickness which enhance its use as a water blocking element for a cable, particularly for a communications cable. Of importance is the need for the tape to be made of a material which has a relatively high porosity. It has been found that the water blockability of the tape 37 increases as the porosity of the tape increases. Porosity may be measured by air permeability in units of cubic feet per minute at a specified water pressure. At 0.5 inch of water pressure, typical porosities are in the range of about 120 to 1000 cfm/min.

The water blocking capability of a Reemay ® spunbonded polyester impregnated tape is a surprising result. Inasmuch as the Reemay material has a relatively high porosity, it would be expected that moisture would penetrate it rather easily. In at least one catalog which discloses a superbonded polyester tape having a relatively high porosity, mention is made that the tape has a relatively low moisture pickup, presumably by surface tension. This seemingly would lead one away from its use as a water blockable tape for use in communications cables.

Evidently, because it is so porous and hence substantially cellular in structure, the tape 37 is capable of accepting a substantial quantity of the impregnating material. As a result, entering water contacts a substantial area of the impregnating material which is water blocking. There is a surprisingly fast reaction between the water blocking material and the water causing the water blocking material to swell and block off further longitudinal movement of the water along the cable.

The porosity of the untreated tape 37 decreases with increasing thickness for a given thickness. In a preferred embodiment, the Reemay ® tape is style 2014 which at 0.5 inch of water has a porosity of 800 CFM/ft$^2$. Reemay tape marketed under code designation 2014 has a density of 1.0 ounce per square yard, has a thickness of 0.008 inch and is formed of substantially straight polyethylene terephthalate fibers. Reemay tape having a code designation of 2024 has a density of 2.1 ounces per square yard, has a thickness of 0.012 inch, has a porosity of 350 CFM/ft$^2$ at 0.5 inch H$_2$O and also is formed of substantially straight polyethylene terephthalate fibers. Reemay tape having a code designation of 2415 has a density of 1.15 ounces per square yard, has a thickness of 0.014 inch, has a porosity of 700 CFM/ft$^2$ at 0.5 inch H$_2$O and is formed of crimped polyethylene terephthalate fibers.

Obviously, various other grades and thicknesses of Reemay spunbonded polyester tape or other similar materials may be used. Material densities of up to about 2 ounces per square yard are practical values. Practical material thickness may range from 0.005 inch to 0.012 inch thick. These values by no means limit the invention but represent the presently preferred ranges.

Although the porosity of the substrate tape 37 is relatively high, that of the impregnated tape, if any, is relatively low. As a result, if the tape 35 is disposed adjacent to the cable jacket, bleed-through of the molten jacket plastic does not occur.

The porosity of the substrate tape 35 must be balanced against other properties. For example, because the tape is to be embodied in a cable, it is beneficial for the tape to have a relatively high tensile strength. For a given tape width, the tensile strength decreases as the thickness decreases. Although a larger thickness is desired insofar as tensile strength is concerned, a larger thickness may result in less porosity, at least for those tapes which are available commercially. Therefore, these two properties must be balanced against each other to arrive at a final thickness. As mentioned hereinbefore, the style 2014 preferred Reemay ® tape has a thickness of 0.008 inch which is suitable for use in the cables of this invention.

Thickness of the tape 37 also is important from another standpoint. In order to allow the cable to be terminated by standard size hardware, the diameter of the cable must be maintained within a desired range. Accordingly, the thickness of each element of the sheath system must be considered. Therefore, the thickness is established while being mindful of the porosity and the tensile strength. The tape 37 must not be too thin, else the tensile strength is affected adversely, and if too thick, the porosity and overall cable outside diameter are affected adversely.

The water swellable tape may be used as a portion of a sheath system in cables other than that shown in FIGS. 1 and 2. For example, in U.S. Pat. No. 4,241,979, issued to P. F. Gagen and M. R. Santana, there is shown a cable 40 (see FIGS. 3 and 4) having a core 41, a core tube 42 filled with a waterblocking material 43, an inner jacket 44 and an outer jacket 46 of plastic material. The cable also includes two layers of helically wound metallic strength members 48—48, the layers being wound in opposite directions. An inner layer of the strength members is disposed between the core tube 42 and the inner jacket 44 and the other between the inner jacket and the outer jacket 46. Underlying each layer of strength members in accordance with this invention is a bedding layer which comprises a spunbonded tape 35 which has been impregnated with a water swellable material. Not only do the tapes 35—35, each of which is wrapped about the cable to have a longitudinal overlapped seam 49, assist in preventing movement of the strength members circumferentially of the cable during handling and placement because of its compressibility, but also they prevent the movement of water through the sheath system and serve to inhibit movement of water longitudinally of the cable.

Figures 5, 6:
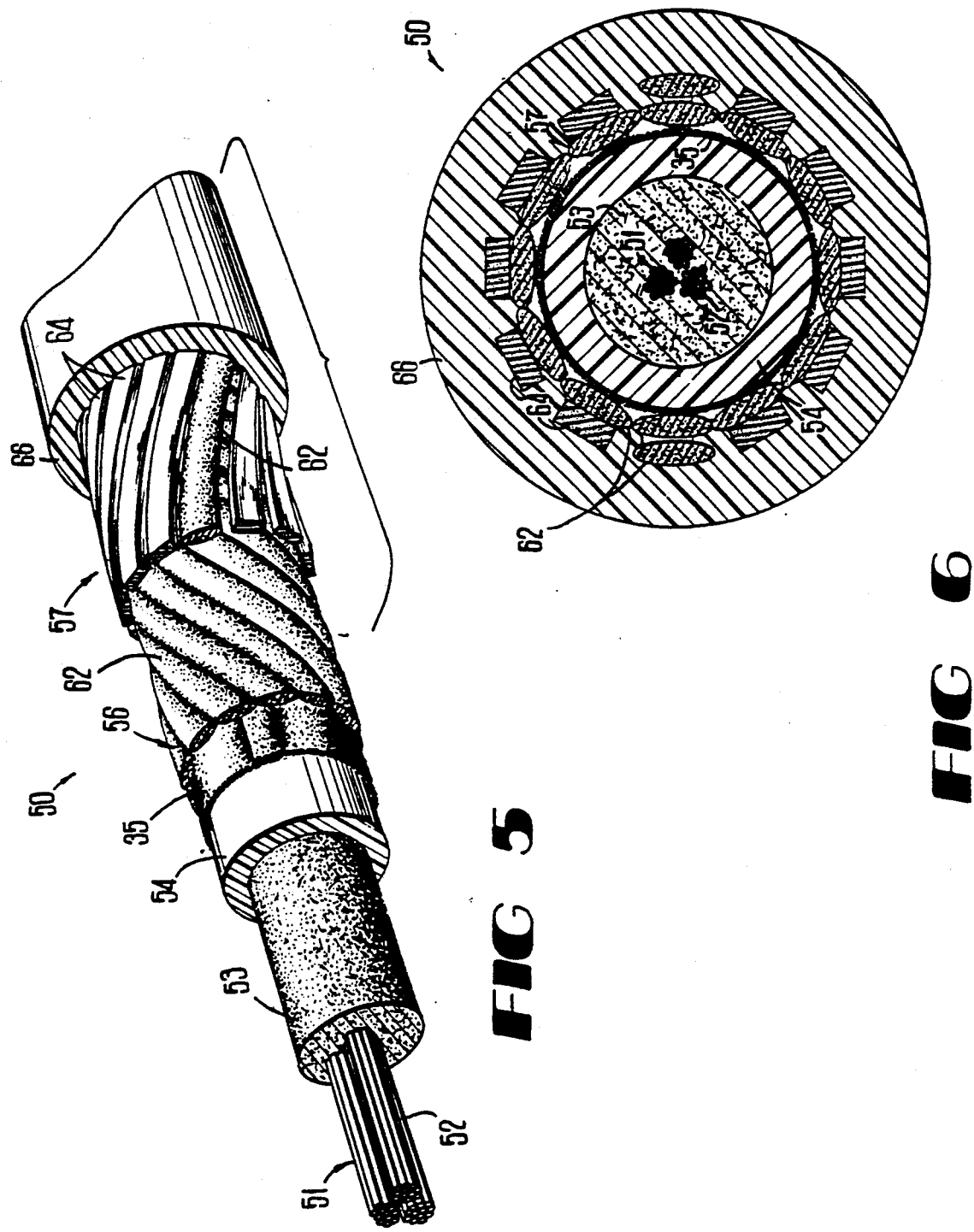
FIGS. 5 and 6 are perspective and end sectional views of still another cable of this invention which includes a water blockable tape.

In another cable 50 (see FIGS. 5 and 6) which is used for optical fiber transmission, a core 51 comprising at least one optical transmission media 52 is enclosed by a core tube 54 and two superimposed layers 56 and 57 of strength members. The core is filled with a waterblocking material 53. The strength members comprise a first plurality 62—62 which occupy the first or inner layer and a second plurality 64—64 which occupy only the outer layer. Several of the first plurality also may be disposed in the outer layer. The second plurality provide the cable with a predetermined compressive strength whereas the first and second cooperate to provide tensile stiffness. A plastic jacket 66 encloses the strength members. A spunbonded tape 35 which has been impregnated with a water swellable material is disposed between the strength members and the core tube.

Figures 7, 8:
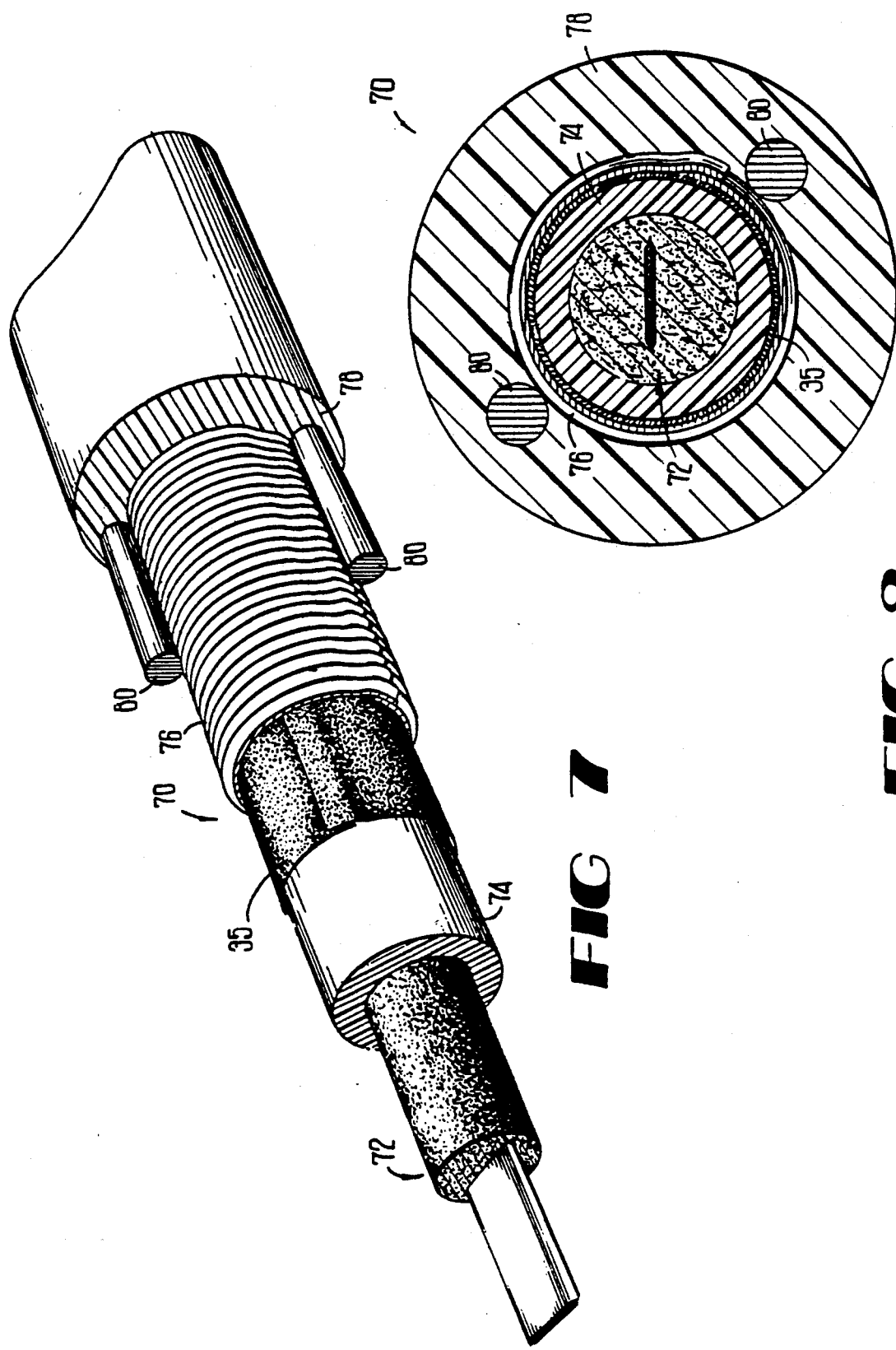
FIGS. 7 and 8 are perspective and end sectional views of another embodiment of this invention.

Going now to FIGS. 7 and 8, there is shown another cable 70. The cable 70 includes a core 72, a core tube 74, a corrugated metallic shield 76 and a plastic jacket 78. Extending longitudinally linearly are two strength members 80—80 which are diametrically opposed. These strength members are embedded at least partially in the plastic jacket and engage the shield 76. A water blockable tape 35 is disposed between the core tube and the shield.

Figure 9:
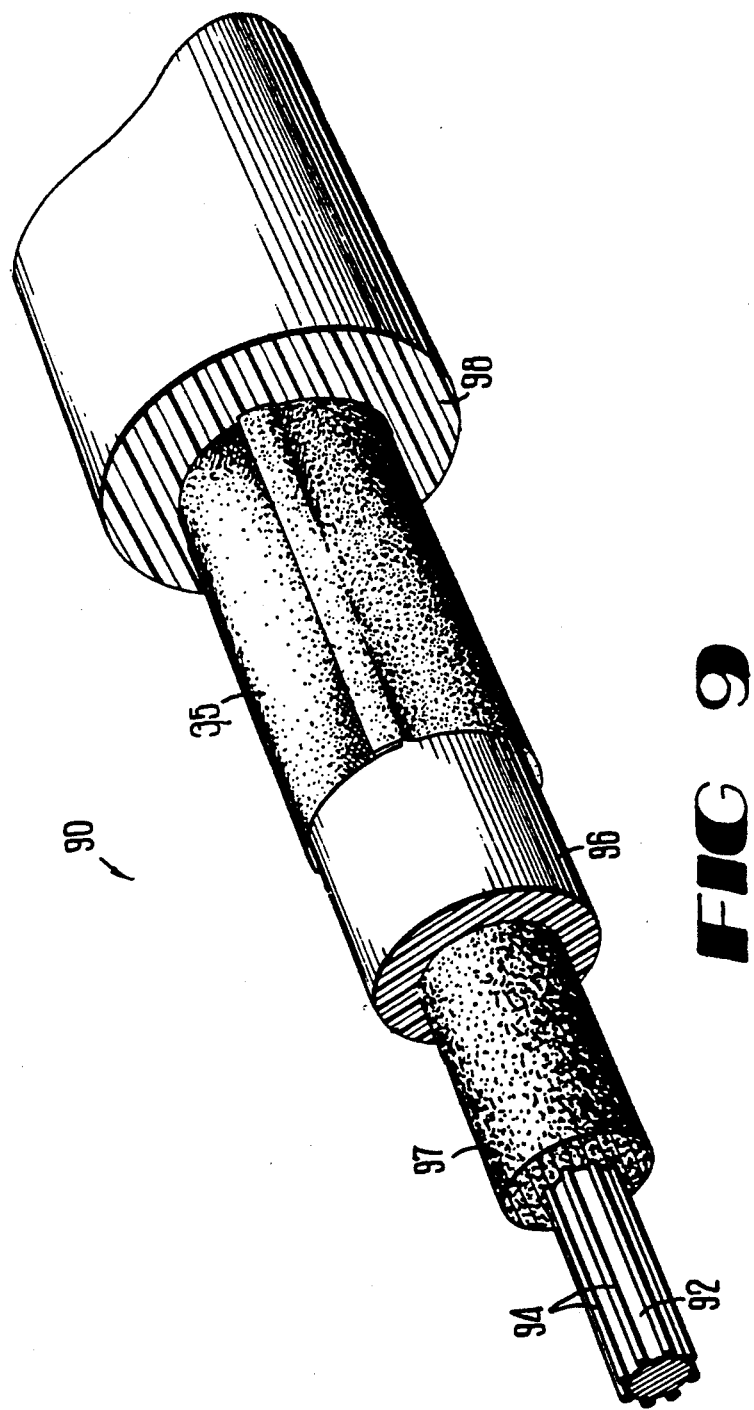
FIG. 9 is a perspective view of yet another embodiment of a cable of this invention.

In FIG. 9, there is shown a cable 90 which includes a centrally disposed strength member 92 and a plurality of optical fibers 94—94. The optical fibers 94—94 are enclosed in a core tube 96 which is filled with a waterblocking material 97. Over the core is wrapped an impregnated tape 35. The impregnated tape 35 is enclosed by a plastic jacket 98.

An impregnated tape 35 also may be used to cover only a portion of the periphery of a portion of a cable sheath system. Such an arrangement is disclosed and claimed in application Ser. No. 07/115,459 filed of even date herewith in the names of C. J. Arroyo, H. P. Debban, and W. J. Paucke, now U.S. Pat. No. 4,815,813.

It is to be understood that the above-described arrangements are simply illustrative of the invention. Other arrangements may be devised by those skilled in the art which will embody the principles of the invention and fall within the spirit and scope thereof.

I claim:

1. A waterblocking tape, which comprises:
   a single non-woven substrate tape which comprises a spunbonded non-woven plastic material and which prior to any treatment thereof has a relatively high tensile strength; and
   a superabsorbent material which impregnates said substrate tape to fill substantially cells thereof such that said substrate tape after impregnated with said superabsorbent material has a relatively low porosity compared to its porosity prior to impregnation.

2. The tape of claim 1, wherein said substrate tape has a relatively small thickness and is a spunbonded polyester material which comprises continuous filament polyester fibers that are randomly arranged, highly dispersed and bonded at filament junctions.

3. The tape of claim 1, wherein said tape has been impregnated with a mixture which comprises water and a superabsorbent material in which the mixture comprises about 4 to 7% by weight of solids.

4. The tape of claim 1, wherein said superabsorbent material is a film comprising an acrylate polymer which includes acrylic acid and sodium acrylate.

5. The tape of claim 4, wherein said impregnated tape has a unit weight which is equal to about 1.1 to 1.8 ounces per square yard.

6. The tape of claim 1, wherein the density of the impregnated tape is about 10 to 80% greater than the density of the unimpregnated substrate tape.

7. The tape of claim 1, wherein said superabsorbent material is a film which includes acrylate acrylamide.

8. The tape of claim 1, wherein the porosity of said tape prior to the impregnation thereof is in the range of about 120 to 1000 CFM/ft² at 0.5 inch of water.

9. The tape of claim 1, wherein said tape has a thickness which does not exceed about 0.010 inch and a tensile strength which is at least about 5 lbs/inch of width.

10. The tape of claim 9 wherein said tape prior to impregnation thereof has a porosity in the range of about 300 to 1000 CFM/ft² at 0.5 inch of water.

11. The tape of claim 1, wherein said waterblocking material is selected from the group consisting of (a) polyacrylic acid; (b) polyacrylamide; blends of (a) and (b); salts of (a) and (b); and copolymers of (a) and (b).

* * * * *